United States Patent Office 3,759,898
Patented Sept. 18, 1973

3,759,898
SYNTHESIS OF ALPHA-[CARBO(5-INDANYLOXY)] BENZYLPENICILLIN
Susumu Nakanishi, East Lyme, Conn., assignor to Pfizer Inc., New York, N.Y.
No Drawing. Filed Sept. 14, 1971, Ser. No. 180,502
Int. Cl. C07d 99/16
U.S. Cl. 260—239.1       7 Claims

ABSTRACT OF THE DISCLOSURE

The preparation of α-[carbo(5-indanyloxy)]benzylpenicillin via the esterification of α - carboxypenicillin with 5-indanol in the presence of N,N'-dicyclohexylcarbodiimide in a reaction-inert solvent at a pH of 2–8.

BACKGROUND OF THE INVENTION

This invention relates to a process for the production of a chemotherapeutic agent, and more particularly, to a process for the synthesis of α-[carbo(5-indanyloxy)]benzylpenicillin, possessing high antibacterial activity following oral administration.

This compound belongs to the family of penicillins which differ from each other in the nature of the R variable and possess the general formula indicated below wherein the acyl moiety on the 6-aminopenicillanic acid is derived from a carboxylic acid or functional derivative thereof such as an acyl chloride or anhydride.

$$R-\overset{O}{\overset{\|}{C}}-\overset{H}{\overset{|}{N}}\underset{6}{\phantom{x}}\underset{5}{\phantom{x}}\overset{1}{\overset{S}{\phantom{x}}}\overset{2}{\phantom{x}}\begin{matrix}CH_3\\CH_3\end{matrix}$$
(positions 7-N-4-3 with CO₂H)

The pharmacodynamic and antibiotic properties of a given penicillin are determined to a great extent by the nature of the R group. The most widely used penicillins are those wherein the R moiety is represented by benzyl, phenoxymethyl- and α-phenoxyethyl. While these well-known analogs are highly antagonistic toward gram-positive microorganisms they have limited gram-negative activity. Consequently, drugs which will combat rise in gram-negative infections, e.g., E. coli, are of value to the medical profession.

Recent efforts to improve the profile of activity within the family of penicillins has resulted in the synthesis of α-carboxybenzylpenicillin (U.S. Patent 3,142,673), a broad spectrum antibiotic with greater efficacy against gram-negative infections via the parenteral route of administration. However, poor oral activity prompted the synthesis of orally active esters of α-carboxybenzylpenicillin. The synthesis of these esters is described in Belgium Specification 726,421, wherein 6–APA is condensed with an arylcarboxy ketene acid derivative and in Belgium specification 726,421, wherein 6–APA is condensed with above mentioned esters by condensing 6–APA with an arylmalonic acid, half-acid chloride, half ester.

SUMMARY OF THE INVENTION

It has now been found that an ester of α-carboxypenicillin, and in particular, α-[carbo(5-indanyloxy)]benzylpenicillin is prepared by reacting α-carboxybenzylpenicillin with 5-indanol in the presence of N,N'-dicyclohexylcarbodiimide in a reaction-inert solvent at a pH of 2–8.

The process of the present invention offers several advantages over those previously described; it represents a one-step process starting with α-carboxybenzylpenicillin which is synthesized from 6-aminopenicillanic acid and phenylmalonic acid (U.S. Patent 3,142,673), and it is a process which allows introduction of the ester variable at the last step in the synthesis, thus avoiding the necessity for incorporation of this moiety into the phenylmalonic acid several steps removed from formation of the final product, said synthetic route being considerably more expensive.

A surprising element in the process of the present invention is the high degree of specificity for the esterification of the α-carboxy group over that in the 3-position of the penicillin molecule.

Further, examination of the final product by thin-layer chromatography reveals that over 96% of the isolated material is the desired product, with the by-products consisting of benzylpenicillin (<1%) and penicilloic acid (2.9%).

It is preferred that the herein described process for the preparation of α-[carbo(5-indanyloxy)]benzylpenicillin be carried out in a non-aqueous reaction-inert solvent at a pH of 2.5.

In like manner, other esters of α-carboxybenzylpenicillin can be prepared by the process of the present invention. These include esters wherein the indanyl moiety is replaced by substituted phenyl wherein the substituent is phenyl, carboxyvinyl, carbo(lower alkoxy)vinyl, carboxy(lower alkyl), carbo(lower alkoxy)lower alkyl;

substituted ac indanyl derivatives wherein the substituent is selected from the group consisting of methyl, chloro and bromo;
ac tetrahydronaphthyl and substituted derivatives thereof, wherein the substituent is selected from the group consisting of methyl, chloro and bromo;
1-(lower)alkoxy-2,2,2-trichloroethyl,
1-(lower)alkoxy-2,2,2-trifluoroethyl,
[carbo(lower)alkoxy](lower)alkoxymethyl,
[dicarbo(lower)alkoxy](lower)alkoxymethyl,
3-[1-($R_1$-substituted)piperidyl],
—$(CH_2)_m NR_1R_2$,
—$CH_2CH(CH_3)NR_1R_2$,
—$CH(CH_3)CH_2NR_1R_2$ and
—(lower alkylene)-Y wherein $m$ is an integer from 2 to 3;

$R_1$ is selected from the group consisting of hydrogen, lower alkyl and benzyl; and $R_2$ is selected from the group consisting of lower alkyl, lower alkanoyl, benzyl, phenyl and carbo(lower)alkoxy; with the proviso that when $R_1$ is hydrogen, $R_2$ is lower alkanoyl or carbo (lower)alkoxy; and Y is selected from the group consisting of azetidino, aziridino, pyrrolidino, piperidino, morpholino, thiomorpholino, N-(lower alkyl)piperizino, pyrrolo, imidazolo, 2-imidazolino, 2,5-dimethylpyrrolidino, 1,4,5,6-tetrahydropyrimidino, 4-methylpiperidino and 2,6-dimethylpiperidino;

wherein each of lower alkoxy, lower alkanoyl and lower alkyl have from 1 to 4 carbon atoms and (lower alkylene) contains from 1 to 3 carbon atoms; and (structure: bicyclic ring with S and Z substituents)

and substituted derivatives thereof, wherein Z is alkylene selected from the group consisting of —$(CH_2)_3$—, and —$(CH_2)_4$—, and wherein the substituent, S, is selected from the group consisting of methyl, chloro and bromo;

γ-phenylallyl, γ-(substituted phenyl)allyl wherein the substituent is selected from the group consisting of at least one of chloro, bromo, fluoro, lower alkoxy, lower alkyl, nitro and methylenedioxy; and γ - phenylpropargyl, γ - (substituted phenyl)propargyl wherein the substituent is selected from the group consisting of chloro, bromo, lower alkoxy, lower alkyl and nitro.

DETAILED DESCRIPTION OF THE INVENTION

The herein described process is conveniently carried out between α-carboxybenzylpenicillin and 5-indanol in a molar ratio of about 1:1, although it is frequently advantageous to employ as much as a 5% excess of the penicillin. As previously mentioned, the condensing agent for said process is N,N'-dicyclohexylcarbodiimide, this reagent being employed in the same molar ratio as the 5-indanol. In practice, a solution of the α-carboxybenzylpenicillin, generated from the mono- or disodium salt using an appropriate inorganic acid, in a reaction-inert solvent is treated with approximately an equimolar amount of the diimide dissolved in the same or different reaction-inert solvent followed, after a few minutes, by the addition of the 5-indanol. The solvent per se is not an integral part of the herein described process, but provides a single contact phase for the starting reagents. The neutralization of the mono- or disodium salt of α-carboxybenzylpenicillin at the outset of the reaction provides a pH of between 2–3 and represents the pH at which both carboxyl groups of the pencillin, i.e., the α- and 3-carboxy moieties, are unionized. Although the herein described process can be conducted at a pH range of 2–8, it is preferred, because of the yield and quality of the product, that a pH of from 2–3 be employed.

By reaction-inert solvent is meant a solvent, which under the conditions of the process, does not enter into appreciable reaction with either the products or the reactants. A further criterion for selection of an appropriate solvent for the process of the present invention is its solubility characteristics for the diimide condensing agent and the by-product, dicyclohexylurea. A suitable solvent should be capable of dissolving approximately 100 mg./ml. of the diimide while having little or no solubility potential for the urea byproduct. This solvent characteristic aids measurably in separation of the desired product in a relatively high state of purity and avoids laborious clean-up procedures. As one skilled in the art can appreciate, these solvents must also have favorable solubility characteristics for the starting materials and the final product. Such preferred solvents include tetrahydrofuran, dioxane, dimethylformamide, methylene chloride and ethyl acetate. Although the aforementioned solvents are all non-aqueous solvents, a small amount of moisture is tolerated in these solvents without markedly affecting the course of the reaction.

The reaction can be conducted over a wide temperature range; ambient temperatures of from 20° to 30° C. are preferred, however, in order to avoid decarboxylation of the α-carboxybenzylpenicillin or hydrolysis of the β-lactam ring of the penicillin molecule. Reaction time is not critical and depends on concentration, temperature and reactivity of the starting reagents. When employing the above mentioned temperature, the reaction is usually complete in 4 to 8 hours.

The indanyl ester of α-carboxybenzylpenicillin is isolated by methods known to those skilled in the art. Experimentally, the completed reaction is filtered to remove the dicyclohexylurea, diluted with the solvent methyl isobutyl ketone and subsequently washed with water. The organic phase containing the desired product is treated with an appropriate base and the corresponding salt precipitates on standing. The isolated salt of the desired product can be utilized for chemotherapeutic purposes or the free acid can be liberated by treatment of the salt with an appropriate acid followed by its conversion to a different salt.

As has been previously noted, a characteristic feature of the acidic compound of the instant invention is its ability to form basic salts. The product of the present process invention is converted to basic salts by the interaction of said acid with an appropriate base in an aqueous or non-aqueous medium. Such basic reagents suitably employed in the preparation of said salts can vary in nature, and are meant to contemplate such vases as organic amines, ammonia, alkali metal hydroxides, carbonates, bicarbonates, hydrides and alkoxides, as well as alkali earth metal hydroxides, hydrides, alkoxides and carbonates. Representative of such bases are ammonia, primary amines such as n-propylamine, n-butylamine, aniline, cyclohexylamine, benzylamine, p-toluidine, ethylamine, octylamine, secondary amines such as dicyclohexylamine and tertiary amines such as diethylaniline, N-methylpyrrolidine, N-methylmorpholine and 1,5-diazabicyclo-[4,3,0]-5-nonene; sodium hydroxide, potassium hydroxide, ammonium hydroxide, sodium ethoxide, potassium methoxide, magnesium hydroxide, calcium hydride and barium hydroxide.

In the utilization of the chemotherapeutic activity of those compounds of the present invention which form basic salts, it is preferred, of course, to use pharmaceutically acceptable salts. Although water insolubility, high toxicity, or lack of crystalline nature may make some salt species unsuitable or less desirable for use as such in a given pharmaceutical application, the water insoluble or toxic salts can be converted to the corresponding acids by decomposition of the salts as described above, or alternately they can be converted to any desired pharmaceutically acceptable basic salt. The said pharmaceutically acceptable salts preferred include the sodium, aluminum, potassium, calcium, magnesium, ammonium and substituted ammonium salts, e.g., procaine, dibenzylamine, N,N'-dibenzylethylenediamine, N,N-bis(dehydroabietyl)-ethylenediamine, 1-ephenamine, N-ethylpiperidine, N-benzyl-β-phenethylamine, triethylamine, as well as salts with other amines which have been used to form salts with benzylpenicillin.

The requisite α-carboxybenzylpenicillin employed as one of the starting reagents for this process is prepared according to the procedure of U.S. Pat. 3,142,673, while 5-indanol and N,N'-dicyclohexylcarbodiimide are commercial chemicals.

α - [Carbo(5 - indanyloxy)]benzylpenicillin described herein exhibits in vitro activity against a wide variety of microorganisms, including both gram-positive and gram-negative bacteria. Its useful activity can readily be demonstrated by in vitro tests against various organisms in a brain-heart infusion medium by the usual two-fold serial dilution technique. The in vitro activity of the herein described compound renders it useful for topical application in the form of ointments, creams and the like, or for sterilization purposes, e.g., sick-room utensils.

This penicillin is also an effective antibacterial agent in vivo in animals, including man, not only via the parenteral route of administration but also by the oral route of administration.

Obviously, the physician will ultimately determine the dosage which will be most suitable for a particular individual person, and it will vary with the age, weight and response of the particular patient as well as with the nature and extent of the symptoms and the pharmacodynamic characteristics of the particular agent. It will often be found that when the composition is administered orally, larger quantities of the active ingredient will be required to produce the same level as produced by a small quantity administered parenterally.

Having full regard for the foregoing factors it is considered that an effective daily oral dose of the compound of the present process invention in humans of approximately 20–100 mg./kg. per day, with a preferred range of about 30–60 mg./kg. per day in single or divided doses, and a parenteral dose of 15–75 mg./kg. per day, with a preferred range of about 10–40 mg./kg. will effectively alleviate the symptoms of the infection. These values are illustrative, and there may, of course, be individual cases where higher or lower dose ranges are merited.

The penicillin ester compound of this process invention exhibits improved absorption on oral administration over that produced by the corresponding free acid or alkali metal salt forms. It, therefore, represents convenient and effective dosage forms of α-[carbo(5-indanyloxy)]benzylpenicillin.

Further, α-[carbo(5-indanyloxy)]benzylpenicillin, although of relatively low activity against gram-negative organisms per se are, when administered orally to animals, including man, metabolized to the parent acid, which has a wide spectrum of activity against gram-negative and gram-positive bacteria. It thus serves as a pro-drug form of the parent compound since it is biologically converted in vivo to said compound. The rate of metabolic conversion of such an ester to the parent acid occurs at such a rate as to provide an effective and prolonged concentration of the parent acid in the animal body. In effect, such an ester acts as depot source for the parent acid.

In determining the in vitro activity of α-[carbo(5-indanyloxy)]benzylpenicillin, the sensitivity of the various microorganisms is determined by the commonly accepted two fold serial dilution technique. Final concentrations of compound per ml. range from 100 mcg. in the first tube to 0.19 mcg. in the tenth tube. The inoculum consists of 0.5 ml. of a $1 \times 10^{-3}$ dilution of a standardized culture. Final volume in each tube or cup in the DisPoso tray is 1.0 ml. The tubes are incubated at 37° C. for approximately 24 hours. The medium used is Witkins synthetic or Brain Heart Infusion (BHI). The sensitivity (MIC—minimal inhibitory concentration) of the test organism is accepted as the least amount of compound capable of producing complete inhibition of growth as evidenced by absence of gross turbidity.

The antimicrobial spectra of α-[carbo(5-indanyloxy)]benzylpenicillin against several bacteria are presented below in Table I. The tests were run under the above mentioned standardized conditions and the minimum concentration (MIC) at which growth of each organism failed to occur was observed and recorded. The compound was tested as the sodium or potassium salt.

TABLE I

In vitro data of α-[carbo (5-indanyloxy)]benzylpenicillin (MIC: mcg./ml.)

| Organism | Sodium salt | Potassium salt |
| --- | --- | --- |
| Staph. aureus 5 | 0.62 | 0.21 |
| Staph. aureus 400 | 100 | 100 |
| Strept. pyogenes 8668 | 0.002 | 0.0045 |
| Strept. pyogenes C203 | 0.009 | 0.002 |
| Strept. faecalis A121 | 0.78 | 0.78 |
| Dip. pneumoniae | 0.031 | 0.031 |
| A. aerogenes 2 | 6.25 | 6.25 |
| E. coli 266 | 3.12 | 6.25 |
| Pr. Vulgaris 59 | 3.12 | 1.56 |
| Ps. aeruginosa 173 | 100 | 100 |
| Sal. typhosa 344 | 12.5 | 6.25 |
| K. pneumoniae 132 | 1.16 | 3.12 |
| Vibrio comma | 3.12 | 3.12 |
| Past. multocida PM | 1.25 | 1.25 |
| Pseudomonas 10490 | 1.56 | 1.56 |

For determining in vivo activity, acute systemic infections in mice were produced by the intraperitoneal inoculation of a standardized culture suspended in 5% hog gastric mucin. The severity of infection was consistently at 1 to 10 $LD_{100}$, i.e., lethal dose—100%: 1 to 10 times the number of organisms needed to kill 100% of the mice. Treatment with test compounds was started at 0.5 hour after the infection. A second dose was administered four hours later. After a holding period of 4 days, living mice were counted and the percent alive calculated. These values were then converted to probits and a $PD_{50}$ value in mg./kg. was calculated using a Probit method (Batson 1957). The $PD_{50}$ is the dose of antibiotic required to protect 50% of the treated mice against the otherwise lethal infection.

Tables II and IIA present in vivo data for α-[carbo(5-indanyloxy)]benzylpenicillin compared with other selected penicillins against several experimental infections in mice. The values are obtained as $PD_{50}$ as mentioned above.

TABLE II

Comparative in vivo activity of α-[carbo(5-indanyloxy)] benzylpenicillin and selected penicillins against E. coli in mice

| Antibiotic | $PD_{50}$ (mg./kg. with 95% confidence limits) | |
| --- | --- | --- |
| | Oral | Subcutaneous |
| α-[Carbo(5-indanyloxy)]benzylpenicillin[1] | 34±8 | 31±11 |
| Carbenicillin | >100 | 33±19 |
| Penicillin G | >100 | >100 |
| Ampicillin | 25±13 | 27±19 |

[1] The sodium and potassium salts exhibit comparable activity. Cephaloglycin against the same E. coli strain shows an oral $PD_{50}$ of 25 mg./kg.

TABLE IIA

Efficacy of α-[carbo(5-indanyloxy)]benzylpenicillin and carbenicillin in vivo against selected pathogens

| | $PD^{50}$ (mg./kg. with 95% confidence limits) | | |
| --- | --- | --- | --- |
| | α-[Carbo(5-indanyloxy)]benzylpenicillin | | Carbenicillin |
| Infecting organism | Oral | Subcutaneous | Subcutaneous |
| Escherichia coli 51A206 | 20.5±6.1 | 22±5.9 | 21.5±5.9 |
| Salmonella choleracsuis 58B242 | 130±37.7 | 105±48.6 | 90±26.5 |
| Pasteurella multocida 59A001 | 6.7±1.8 | 12.0±2.2 | 12.0±2.5 |
| Proteus vulgaris 57A059 | 320±154 | 290±135 | 250±69 |
| Staphylococcus aureus 5 | 40±10.7 | 41±9.8 | 38±3.1 |
| Streptococcus pyogenes C203 | 14±4.5 | 8±2.5 | 8.7±2.7 |

The novel product of this process invention, as previously mentioned, is of value as an antibacterial agent and is remarkably effective in treating a number of infections caused by susceptible gram-negative and gram-positive bacteria in poultry and animals, including man. For such purposes, the pure materials or mixtures thereof with other antibiotics can be employed. It may be administered alone or in combination with a pharmaceutical carrier on the basis of the chosen route of administration and standard pharmaceutical practice. For example, it may be administered orally in the form of tablets containing such excipients as starch, milk sugar, certain types of clay, etc., or in capsules alone or in admixture with the same or equivalent excipients. It may also be administered orally in the form of elixirs or oral suspensions which may contain flavoring or coloring agents, or be injected parenterally, that is, intramuscularly or subcutaneously. For parenteral administration, it is best used in the form of a sterile aqueous solution which may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and the nontoxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

The following examples are provided solely for the purpose of illustration.

EXAMPLE 1

α-[Carbo(5-indanyloxy)]benzylpenicillin

To 20.9 g. (52.5 mmoles) of α-carboxybenzylpenicillin monosodium salt in 50 ml. of dioxane is added sufficient 6 N hydrochloric acid to provide a pH of 2.5, followed by the addition of 10.3 g. (50 mmoles) of N,N'-dicyclohexylcarbodiimide in 50 ml. of the same solvent. The resulting reaction mixture is allowed to stir at room temperature for 15–20 minutes and is then treated with 6.7 g. (50 mmoles) of 5-indanol. Stirring is continued for an additional 5 hours, followed by filtration of the insoluble N,N'-dicyclohexylurea and treatment of the filtrate with 2 x 100 ml. and 1 x 25 ml. portions of methyl isobutyl ketone (MIBK). The combined MIBK layers are washed with 50 ml. of water and dried over magnesium sulfate. The solvent is removed under reduced pressure to provide the product as an amorphous solid.

EXAMPLE 2

α-[Carbo(5-indanyloxy)]benzylpenicillin n-ethylpiperidine salt

The procedure of Example 1 is repeated with the exception that the methyl isobutyl ketone solution of the desired product, after drying over magnesium sulfate, is treated with 6.25 g. (55 mmoles) of N-ethylpiperindine and the resulting solution allowed to stir in the cold for 2.5 hours. The resulting salt which precipitates is filtered and dried in vacuo, 10.9 g. (36% yield), M.P. 135–148° C. (dec.).

Neutralization equivalent: Calcd.: 607. Found: 619.

In a similar manner, by substituting an appropriate amine in place of N-ethylpiperidine, the following salts are prepared: triethylamine, tributylamine, N,N'-dibenzylethylenediamine, procaine and dibenzylamine.

EXAMPLE 3

α-[Carbo(5-indanyloxy)]benzylpenicillin sodium salt

To 6.07 g. (10 mmoles) of α-[carbo(5-indanyloxy)]benzylpenicillin N-ethylpiperidine salt in a mixture of 20 ml. of water and 60 ml. of methyl isobutyl ketone (MIBK) is added sufficient 12 N hydrochloric acid to provide a pH of 2.5. The MIBK is separated and the aqueous washed with 5 ml. of MIBK. The MIBK extracts are combined, dried over magnesium sulfate and treated with 30 ml. of acetone. A solution of 7.74 ml. of ethyl acetate containing 1.826 g. (11 mmoles) of 2-ethyl sodium hexanoate is added dropwise over a 5-minute period and the mixture allowed to stir at 0–5° C. for 2 hours. The resulting precipitate of sodium salt is filtered, slurried in 10 ml. of diisopropyl ether, refiltered and dried, 4.6 g., M.P. 207–213° C.

EXAMPLE 4

α-[Carbo(5-indanyloxy)]benzylpenicillin potassium salt

To a solution of 130 g. (0.21 mole) of α-[carbo(5-indanyloxy)]benzylpenicillin N-ethylpiperidine salt in 1850 ml. of benzene is added 45.2 g. (0.25 mole) of 2-ethyl potassium hexanoate dissolved in 165 ml. of ethyl acetate. The mixture is heated to 40° C. at which time all the solids are dissolved. The clear solution is allowed to stand at room temperature for 2-3 hours. The crystallized potassium salt is filtered and dried in vacuo, 105 g., M.P. 190–191° C.

In a similar manner, substitution of 2-ethyl lithium hexanoate for the corresponding potassium salt allows the preparation of the corresponding α-[carbo(5-indanyloxy)]benzylpenicillin lithium salt.

EXAMPLE 5

α-[Carbo(5-indanyloxy)]benzylpenicillin calcium salt

To 6.07 g. (10 mmoles) of α[carbo(5-indanyloxy)] benzylpenicillin N-ethylpiperidine salt in 20 ml. of water and 60 ml. of methyl isobutyl ketone (MIBK) is added sufficient 6 N hydrochloric acid to provide a pH of 2.5. The MIBK is separated, dried over sodium sulfate and treated with 890 mg. (12 mmoles) of calcium hydroxide in 15 ml. of water. The reaction is stirred for 20 minutes at room temperature and is then treated with 50 ml. of acetone. Stirring is continued for an additional 20 minutes and the resulting magnesium salt is filtered and dried in vacuo.

In a similar manner, starting with the N-ethylpiperidine salt and the requisite base as the metal hydroxide, are prepared the corresponding magnesium, barium, ammonium and aluminum salts.

EXAMPLE 6

α-[Carbo(5-indanyloxy)]benzylpenicillin

To 31.4 g. (88.8 mmoles) of α-carboxylbenzylpenicillin monosodium salt in 80 ml. of tetrahydrofuran is added sufficient 2 N aqueous sodium hydroxide to provide a pH of 7.0. Sixteen and four-tenths grams (75 mmoles) of N,N'-dicyclohexylcarbodiimide in 75 ml. of the same solvent is added and the reaction mixture allowed to stir at room temperature for 20 minutes. To the resulting reaction mixture is added 10.1 g. (75 mmoles) of 5-indanol and stirring is continued for 4–5 hours followed by filtration of the insoluble N,N'-dicyclohexylurea. The filtrate is adjusted to pH 2–3, and extracted several times with methyl isobutyl ketone (MIBK). The combined MIBK extracts are dried over magnesium sulfate and the solvent is removed in vacuo to provide the desired product as a yellow amorphous solid.

What is claimed is:

1. In the process for preparing α-[carbo(5-indanyloxy)]benzylpenicillin, the improvement which comprises reacting α-carboxybenzylpenicillin with 5-indanol at a temperature of from 20 to 30° C. in the presence of N,N'-dicyclohexycarbodiimide in a reaction-inert solvent selected from the group comprising dioxane, tetrahydrofuran, ethyl acetate, dimethylformamide and methylene chloride, at a pH of 2–8.

2. The process of claim 1 wherein the pH is 2.5.

3. The process of claim 2 wherein the solvent is dioxane.

4. The process of claim 2 wherein the solvent is tetrahydrofuran.

5. The process of claim 2 wherein the solvent is ethyl acetate.

6. The process of claim 2 wherein the solvent is dimethylformamide.

7. The process of claim 2 wherein the solvent is methylene chloride.

References Cited

UNITED STATES PATENTS

| | | | |
|---|---|---|---|
| 3,580,908 | 5/1971 | Butler | 260—239.1 |
| 3,681,342 | 8/1972 | Butler et al. | 260—239.1 |
| 3,686,168 | 8/1972 | Timbeck | 260—239.1 |

NICHOLAS S. RIZZO, Primary Examiner

U.S. Cl. X.R.

424—271